Sept. 20, 1938.  E. L. BOWLES  2,130,414
ELECTRIC ACOUSTIC RECEIVER
Filed Oct. 7, 1932
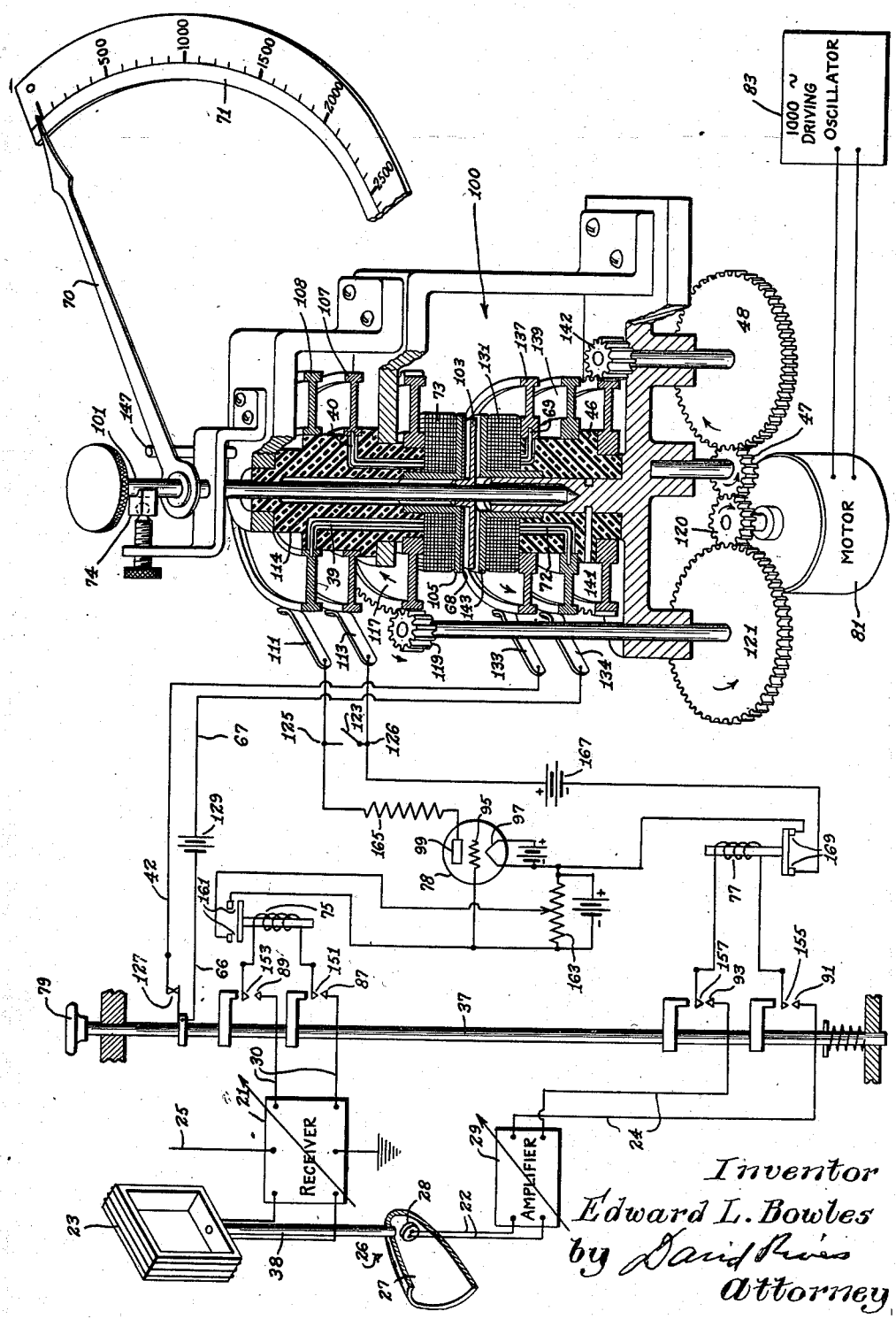
Inventor
Edward L. Bowles
by David Rines
Attorney Patented Sept. 20, 1938

2,130,414

UNITED STATES PATENT OFFICE 2,130,414

ELECTRIC ACOUSTIC RECEIVER

Edward Lindley Bowles, Wellesley Farms, Mass.

Application October 7, 1932, Serial No. 636,705

3 Claims. (Cl. 177—352)

The present invention relates to signaling, and more particularly to electric-acoustic receivers.

The speed of travel of electric waves, such as radio waves, in free space, as is well known, is that of light which, in the case of many problems, may be considered as substantially instantaneous. The velocity of sound in air, on the other hand, as is also well known, is very low by comparison, being, under normal conditions of sound intensity and atmosphere, in the neighborhood of 1,000 ft. per second, and in water only about four times this latter value.

An object of the present invention, therefore, is to provide a novel electric-acoustic receiver for indicating or otherwise determining this difference in the speeds of travel of electric waves and of audible or super-audible sound waves in either air or water to determine either the position or the direction, or both, of one object with respect to another.

It is well known, for example, that if a ship at the transmitting station, is equipped to send out radio waves modulated by a 1,000 cycle (or any other value) oscillator, for very short periods; and if, at the same time, a signal in the form of an acoustic wave is sent out from this same modulating source, and for short periods of the same duration; then another vessel, at the receiving station, equipped to receive both the periodically modulated radio signal and the periodic sound signal, will, in accordance with the present invention, and by virtue of the difference in time of arrival of these two modulating impulses, be able to determine the distance or the direction, or both, of the transmitting ship.

If the difference in time between the arrival of the sound wave, through the air, let us say, and the modulation pulse in the radio wave is one second, the distance of the transmitting boat, or other object, from the receiving source, will be 1,000 feet. If the difference is two seconds, the corresponding distance is 2,000 feet; if three seconds, 3,000 feet; and so on. The time interval between the arrival of a pulse of the modulated radio wave and the arrival of the acoustic wave pulse is thus a measure of the distance between the transmitting and the receiving stations.

If the sound-radiating device is coupled to the water rather than to the air of a transmitting medium, and if, all other conditions remaining the same, the difference of arrival of the two pulses is one second, the distance between stations would be approximately 4,000 feet.

As an example of elastic waves, reference might be made to acoustic or sound waves, whether audible (or sonic) or super-audible (or supersonic). The term "acoustic" will therefore be used, for brevity, in the claims to denote any elastic wave.

A further object is to provide a new and improved time-measuring device. This device may have general application, but it is particularly adapted for use in the said receiver.

Other and further objects will be explained hereinafter, and will be particularly pointed out in the appended claims.

The invention will now be explained more fully in connection with the accompanying drawing, the single figure of which is a diagrammatic view of circuits and apparatus arranged and constructed according to a preferred embodiment of the present invention, illustrating a receiver of electric and acoustic waves together with a time interval measuring or indicating device.

A radio receiver 21 of any convenient type is diagrammatically shown associated with a conventional loop antenna 23 and a vertical antenna 25 to render it unidirectionally responsive. The loop 23 has a fixed axis 38, to which is fixed also a directional sound receiver 26, comprising, preferably, a parabolic reflector or concentrator 27 and a microphone 28 disposed at the focus of the reflector 27. In this way, the radio-wave and the sound-wave receivers 23 and 26 are oriented in like manner, both pointing to the same source of the respective waves. The microphone 28 is connected, by conductors 22, to an amplifier 29 which, in turn, is connected by conductors 24, to a relay 77. A direct indication of the distance between the sending and the receiving vessels, or other objects, may be furnished by the indicating device 100 comprising an indicating needle 70 and an associated scale 71.

A control tube 78 of the grid controlled arc type for example is employed. This is a gaseous tube, so arranged and adjusted that, if the bias voltage on its grid 95 is kept sufficiently negative, there will be no arc conduction between its thermionic filament 97 and its plate or anode 99. Under these conditions, the grid 95 will exercise a control of the thermionic space current from the cathode 97 to the anode 99, just as in any other three-electrode, high, vacuum tube. If, on the other hand, the voltage of the grid 95 is gradually made more and more positive, a point will be reached when an arc discharge will take place between the thermionic cathode 97 and the anode 99. After this arc takes place, the grid 95 loses all control of the space current from the filament 97 to the plate 99. The control of the grid can be restored by interrupting the plate circuit, and by making e grid again negative to the proper degree, and en reconnecting the anode circuit.

The needle 70 is fixed to a shaft 101, to which fixed a small disc 103 of magnetic material. mmediately above this disc is a magnetic driving oil 73 which, when excited, magnetizes a rotatble plate 105, causing it to attract the disc 103 nd thereby to clutch this disc and connect it gidly to the element 105. A thin film 68 of nonagnetic material is placed between the magnetic lement 105 and the disc 103, so that they shall ot tend to adhere due to any slight remanent agnetic effect. The current is led into and out f this clutch-control coil 73, along conductors 39 nd 40, by means of commutators 107 and 108, ounted upon an insulating cylinder 114, and ssociated with brushes 111 and 113. The commutators 107 and 108, the cylinder 114, the conluctors 39 and 40 mounted therein, and the clutch ontrol coil 73 are rigidly fixed with respect to ne another thereby forming a unitary structure. The cylinder 114 carries also a gear 117 operated y a pinion 119 that is driven from a synchronous notor 81 through a pinion 120 and a gear 121. The synchronous motor 81 is driven at a predeermined speed by means of a vacuum-tube oscilator or other power source 83.

When the circuit of the coil 73 is open, and the lutch 103, 105 is, therefore, ineffective, the synhronous motor 81 rotates the cylinder 114 and ts associated, fixed parts, without turning the lisk 103, the needle shaft 101 and the needle 70 mounted thereon. If a current is now sent in hrough the brush 111, and out through its brush 113, or vice versa, the clutch control coil 73 will magnetize the clutch face 105, thus causing the shaft 101 to turn with the gear 117. The needle 70, with the shaft 101 and the needle structure associated therewith, will continue to rotate, the needle 70, progressing along the scale 71, just as long as there is current in the clutch coil 73. To prevent the needle from moving off the scale 71, a protective relay 123 is arranged to short-circuit the clutch coil 73 at points 125 and 126 and is actuated by the pressure of the needle 70 as it reaches the upper end of its scale range.

The needle 70 may at any time be brought back to the zero position, as long as the synchronous motor 81 is in operation, by closing contact members 127, causing current from a battery 129 to course through a second clutch coil 131, through brushes 133 and 134. One of the contact members 127 is mounted upon a sliding rod 37, so as to be manipulated by an operating switch handle 79, and the other contact member 127 is stationary. The circuit is from one terminal of the battery 129, by way of a conductor 66, through the contact members 127, by way of a conductor 42, to the brush 133, a commutator 137. by way of a conductor 69, to the coil 131; and from the coil 131, by way of a conductor 72, to a commutator 139, the brush 134, and by way of a conductor 67, back to the other terminal of the battery 129. Upon the closing of this circuit, to send current through this clutch coil 131, a magnetic field will be created. The entire, lower, magnetic-clutch structure, carrying the coil 131, the commutators 137 and 139 disposed about an insulating cylinder 46, and a gear 141, also carried by the cylinder 46, will thereupon be actuated to rotate the needle 70 in a counter-clockwise direction. This is effected by the synchronous motor 81 driving a pinion 142 that meshes with the gear 141, the pinion 142 being driven from the pinion 120 by a pinion 47 and a gear 48. The lower clutch is similar to the upper clutch, the clutch disc 103, that is connected rigidly with the needle structure being adapted to become clutched to a lower clutch disc 143. The space between the clutch discs 103 and 143 is made sufficiently large so that they do not come in contact. In this way, rotation of the clutch structure will simply bring the needle back to zero, as determined by a stop 147. Further rotation of the lower clutch structure will in no way harm the needle structure because of the above-mentioned space between the elements 103 and 143 and the resulting "slip".

A controlling relay 75 is connected with the radio receiver 21 by the conductors 30 and a controlling relay 77 is similarly connected with the amplifier 29 of the acoustic receiver 26 by the conductors 24. The relay 75 controls normally open or disconnected contact members 161 and the relay 77 controls normally closed or connected contact members 169. The conductors 30 are respectively connected with contact members 87 and 89 and the conductors 24 with contact members 91 and 93. Contact members 151, 153, 155 and 157 are mounted upon the sliding rod 37, so as to be caused to engage simultaneously the respective contact members 87, 89, 91 and 93.

Assuming that the needle pointer 70 is at zero, and that the control knob 79 is depressed, the respective pairs of contact members 87 and 151, 89 and 153, 91 and 155, and 93 and 157, will become engaged, and the contact members 127 will have become opened, the latter condition precluding the existence of any current in the zero-return clutch coil 131. Let it further be assumed that a distant ship sends out, simultaneously, an audio pulse, modulating a radio wave, and an audio pulse, acting on the air or water medium directly. The radio pulse, obviously the first to arrive, will cause the closing of the contact members 161 of the relay 75. The closing of these contact members 161 will effect the short-circuiting of a portion of a voltage-divider wire 163, connected between the filament 97 and the grid 95 of the control tube 78. The bias of the grid 95 will thus become reduced to a point where an arc discharge will take place between the filament 97 and the plate 99.

The plate current will course from the plate 99, through a limiting resistor 165, past the terminal 125, in through the brush 111, the commutator 108 and the conductor 39, through the clutch control coil 73, conductor 40, commutator 107 and brush 113, then, past the terminal 126 and through a plate battery 167, and through relay contact 169, back to the filament 97. Owing to the characteristics of the control tube 78 already described, this condition will prevail even after the initiating pulse has passed, thus permitting the contact members 161 of relay 75 to reopen. Thus the needle 70 once it has become actuated, will continue to move up the scale 71 until the acoustic pulse received by the acoustic-receiving device 27 causes the contacts 169 of relay 77 to open, thus opening the plate circuit of the control tube 78 and interrupting the arc. Upon the opening of this circuit, the grid 95 is enabled to regain control of the tube 78 since the contact members 161 of the relay 75 have already opened, and therefore, the original, higher negative bias already prevails in the tube 78.

If the needle 70 and its moving system have been critically damped by the friction of a threadedly adjusted, clamping screw 74, its rotation will cease the moment the current through the clutch coil is interrupted. The needle 70 will thus come to rest on the scale 71 at a distance corresponding to the time interval between the radio-received and the acoustically-received pulse signals from the transmitting ship. There will be a definite relationship between this time interval and the distance between the transmitting and the receiving devices. The scale 71 may, therefore, be calibrated to read distance directly.

Modifications within the scope of the present invention will readily occur to persons skilled in the art. It is therefore desired that the above-described embodiment of the invention shall be regarded as illustrative of the invention, and not restrictive, and that the appended claims be construed broadly, except insofar as it may be necessary to impose limitations in view of the prior art.

What is claimed is:

1. A receiver comprising, means for receiving electric-wave signals, means for receiving acoustic-wave signals, an indicator, means for actuating the indicator, the said actuating means being normally ineffective, two relays, a grid-controlled, arc tube having input and output circuits respectively controlled by the relays, means controlled by the electric-wave signal receiving means and operative upon the receipt of an electric-wave signal thereby for actuating the input-circuit relay, means controlled by the input circuit upon the actuation of the input-circuit relay for rendering effective the actuating means to cause the actuating means to start to actuate the indicator and for thereafter maintaining the actuating means effective to actuate the indicator irrespective of the position occupied by the input-circuit relay, means controlled by the acoustic-wave signal receiving means operative upon the receipt of an acoustic-wave signal thereby for actuating the output-circuit relay, and means controlled by the output-circuit relay upon the actuation of the output-circuit relay for rendering the actuating means ineffective, thereby to stop the further actuation of the indicator.

2. A receiver comprising, means for receiving electric-wave signals, means for receiving acoustic-wave signals, an indicator, means for actuating the indicator, the said actuating means being normally ineffective, a normally open relay, a normally closed relay, a circuit controlled by the normally open relay, a circuit controlled by the normally closed relay, means controlled by the electric-wave signal receiving means for closing the normally open relay, thereby to close the first-named circuit, means controlled by the closing of the first-named circuit for rendering the actuating means effective to start to actuate the indicator and for thereafter maintaining the actuating means effective to actuate the indicator irrespective of the position occupied by the normally open relay, means controlled by the acoustic-wave signal receiving means for opening the normally closed relay, thereby to open the second-named circuit, and means controlled by the opening of the second-named circuit for rendering the actuating means ineffective, thereby to stop the further actuation of the indicator.

3. Apparatus for measuring time intervals, comprising a time indicator, means for actuating the indicator, a relay with contact members normally open, a second relay with contact members normally closed, a grid-controlled arc tube having an input circuit in which the normally open contact members are connected to maintain the input circuit normally open and an output circuit in which the normally closed contact members are connected to maintain the output circuit normally closed, means for closing the normally open contact members to close the input circuit, means controlled by the closing of the input circuit to render the actuating means effective to actuate the indicator, means for opening the normally closed contact members to open the output circuit, and means controlled by the opening of the output circuit to render the actuating means ineffective, thereby to stop the further actuation of the indicator.

EDWARD L. BOWLES.